US008996257B2

(12) United States Patent
Han et al.

(10) Patent No.: US 8,996,257 B2
(45) Date of Patent: Mar. 31, 2015

(54) VEHICLE ANTI-ICING AND DE-ICING SYSTEMS AND CORRESPONDING METHODS OF OPERATION

(71) Applicant: GM Global Technology Operations LLC, Detroit, MI (US)

(72) Inventors: Taeyoung Han, Bloomfield Hills, MI (US); Shailendra Kaushik, Beverly Hills, MI (US); Bahram Khalighi, Troy, MI (US); Jeffrey A. Bozeman, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/171,011

(22) Filed: Feb. 3, 2014

(65) Prior Publication Data

US 2014/0217194 A1 Aug. 7, 2014

Related U.S. Application Data

(60) Provisional application No. 61/759,451, filed on Feb. 1, 2013.

(51) Int. Cl.
*B60R 22/00* (2006.01)
*B60S 1/48* (2006.01)
*B60S 1/56* (2006.01)
(52) U.S. Cl.
CPC .............. *B60S 1/488* (2013.01); *B60S 1/485* (2013.01); *B60S 1/56* (2013.01)
USPC ........................................................ 701/45

(58) Field of Classification Search
USPC ............................................................ 701/45
See application file for complete search history.

(56) References Cited

U.S. PATENT DOCUMENTS

| | | | | |
|---|---|---|---|---|
| 5,904,321 A * | 5/1999 | Cox et al. | .................. | 244/134 R |
| 2005/0274398 A1 * | 12/2005 | Fonville et al. | ................. | 134/34 |
| 2007/0006571 A1 * | 1/2007 | Vetrovec | .......................... | 60/281 |
| 2007/0137590 A1 * | 6/2007 | Vetrovec | ..................... | 123/25 A |
| 2012/0217194 A1 * | 8/2012 | Sansalone | ................ | 210/170.03 |

* cited by examiner

*Primary Examiner* — Hussein A. Elchanti
(74) *Attorney, Agent, or Firm* — Mickki D. Murray; Parks Wood, LLC

(57) ABSTRACT

A system, for inhibiting ice formation on a vehicle surface, and de-icing if determined needed to remove any frozen matter formed on the surface, including an anti-icing reservoir, a fluid-selecting control valve, and code that causes a processor to perform operations including determining whether the vehicle is parked, initiating, if parked, activation of, or obtaining of readouts from, any local sensors or routines to be used to determine whether a condition triggering initiation of an anti-freezing cycle is present. The operations include commencing, if triggered, an anti-icing cycle, including initiating changing of the fluid-selection valve to select the anti-freezing reservoir, and initiating pumping of the anti-icing fluid from the anti-icing reservoir to and through a fluid-dispensing nozzle, and onto the surface for inhibiting bonding of frozen material on the surface and/or remove any already formed frozen material on the surface.

20 Claims, 5 Drawing Sheets

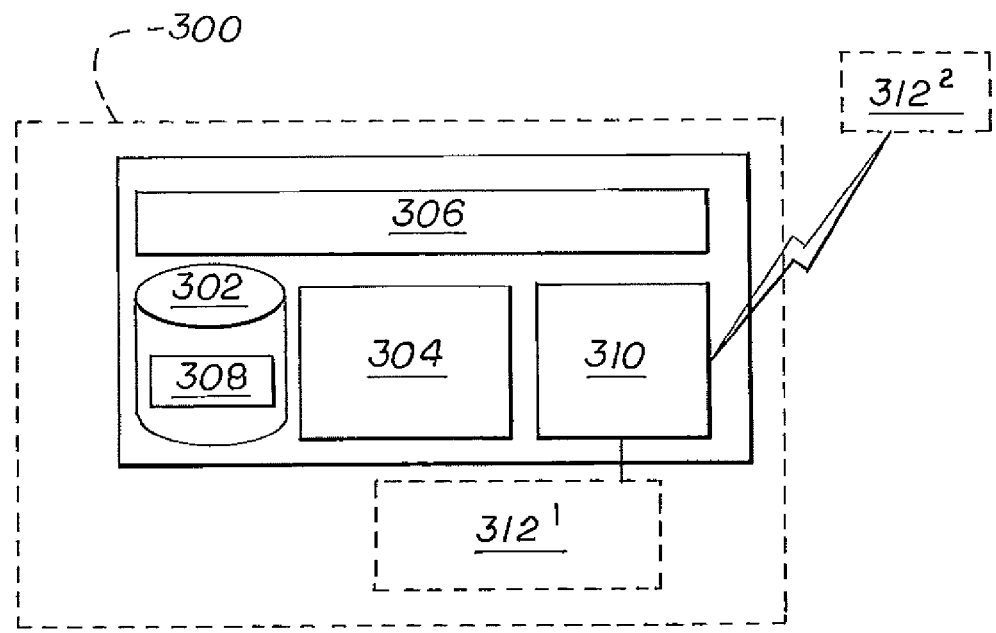
Fig_3
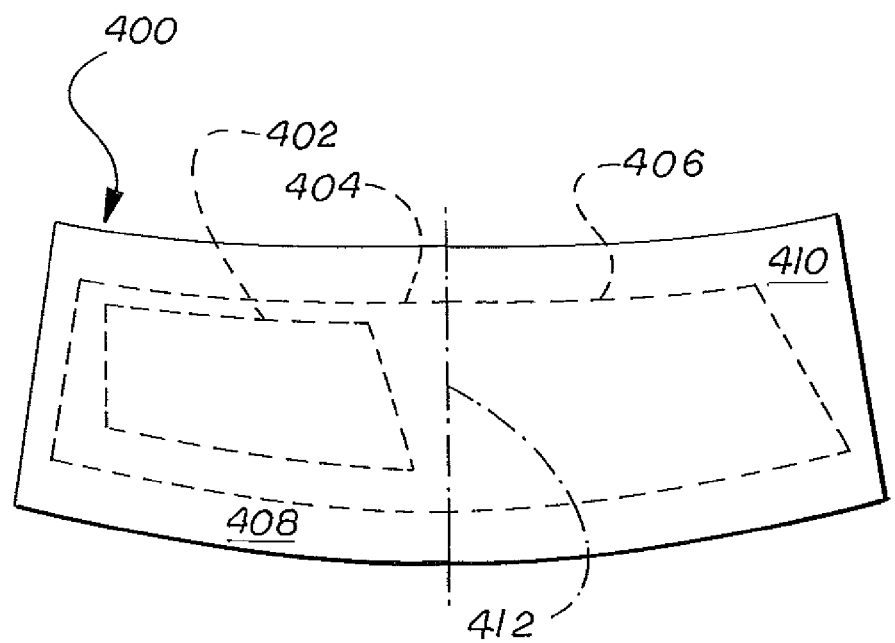
Fig_4

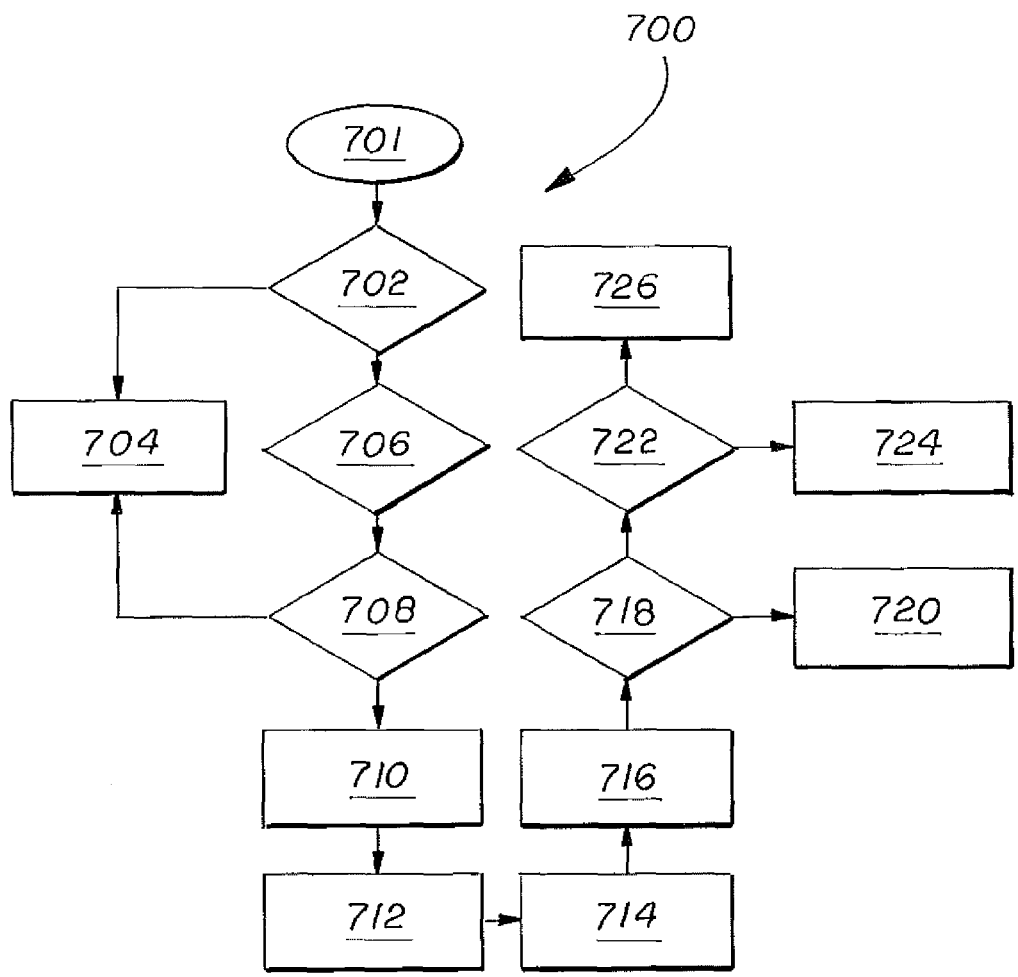

VEHICLE ANTI-ICING AND DE-ICING SYSTEMS AND CORRESPONDING METHODS OF OPERATION

TECHNICAL FIELD

The present disclosure relates generally to anti-icing and de-icing systems and, more particularly, to such systems, and controls and methods for using the same for inhibiting formation of ice, frost, and snow on optical surfaces of an automobile (e.g., windows, mirrors, light covers), and to remove any frozen material that is nonetheless formed on the surfaces.

BACKGROUND

Users of conventional vehicles left outdoors during inclement freezing weather often come out windows and mirrors covered in ice or snow. The user has two primary options at that point. They can begin manually scraping the windows and mirrors. They can also start the vehicle and the window-defrost system of the vehicle.

Scraping windows and mirrors has shortcomings including usually requiring arduous labor on the part of the user. Scrapping off ice or snow also is time consuming and requires the user to stand outside in the cold. There is also a risk of scratching the vehicle.

Using the defrost system is time consuming as well. The defrost system also uses a relatively-high amount of energy, both in terms of fuel required to idle the engine and the electric energy used to operate the defrost system.

And with most modern vehicles not having defrost systems for its mirrors, sunroof, side windows, and lamp covers, manual scraping would still be required for those surfaces.

Improved systems and methods to avoid these challenges are needed. The technology of the present disclosure solves these and other shortcomings of conventional systems.

SUMMARY

The present disclosure relates in some embodiments to vehicular anti-icing and de-icing systems, and controls and methods for using the same to inhibit formation of ice, frost, and snow on exterior surfaces of vehicle windows, mirrors, etc., and to remove any that is nonetheless formed on the surfaces.

In one aspect, the technology includes a system, for inhibiting ice formation on a vehicle surface, and de-icing if determined needed to remove any frozen matter formed on the surface, including an anti-icing reservoir, a fluid-selecting control valve, and code that causes a processor to perform operations including determining whether the vehicle is parked, initiating, if parked, activation of, or obtaining of readouts from, any local sensors or routines to be used to determine whether a condition triggering initiation of an anti-freezing cycle is present. The operations include commencing, if triggered, an anti-icing cycle, including initiating changing of the fluid-selection valve to select the anti-freezing reservoir, and initiating pumping of the anti-icing fluid from the anti-icing reservoir to and through a fluid-dispensing nozzle, and onto the surface for inhibiting bonding of frozen material on the surface and/or remove any already formed frozen material on the surface.

In another aspect, the technology includes a memory like that of the system described in the previous paragraph.

In still another aspect the technology includes a method of performing functions like those of the two immediately preceding paragraphs.

Other aspects of the present invention will be in part apparent and in part pointed out hereinafter.

DESCRIPTION OF THE DRAWINGS

FIG. 3 illustrates a controller in the form of a computer system, and various inputs, which can be a part of the system or in operative communication with the system, according to the present disclosure.

FIG. 4 illustrates an exemplary breakdown of windshield surface areas, assigned various priorities relating to being cleared of ice, frost, etc., for use in configuring the system, according to an embodiment of the present disclosure.

FIG. 7 illustrates a method for using the second exemplary system, shown in FIG. 2, to inhibit formation of frozen water or to de-ice the surface, according to an embodiment of the present disclosure.

DETAILED DESCRIPTION

Figure 1:
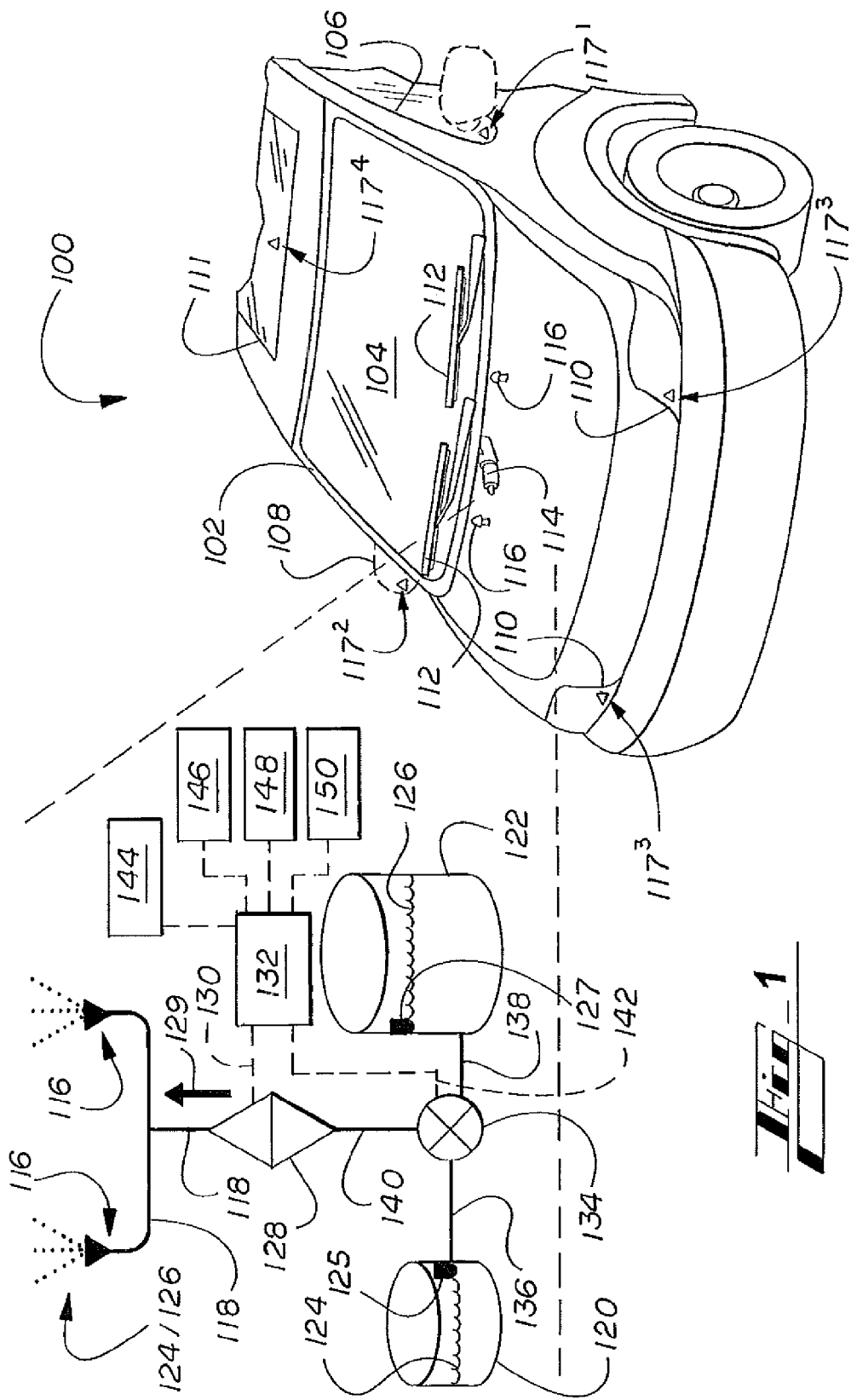
FIG. 1 illustrates a first exemplary anti-icing system according to the present disclosure.

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components.

In some instances, well-known components, systems, materials or methods have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. OVERVIEW OF THE DISCLOSURE

In various embodiments, the present disclosure describes anti-icing systems for use in vehicles. The disclosure describes controls and methods for operating the anti-icing system to inhibit formation of ice, frost, and snow on outside optical surfaces, such as mirrors, surfaces, moon/sun roofs, and light covers.

The system in some embodiments is also configured to de-ice any frozen material that may still formed on the surfaces despite the anti-icing functions.

The system includes any of a variety of components depending on the embodiment. Example components include a controller configured to determine when icy conditions exist, and so when anti-icing functions should be performed.

The system also includes a reservoir to hold anti-icing fluid, and a tube or conduit connecting the reservoir to one or more dispensing components—e.g., spray nozzles.

The system also includes at least one pump for pumping the anti-icing fluid to and through the dispensing components.

For embodiments in which the dispensing components are the same as that used for dispensing windshield washer fluid, the system includes a valve or other diverting device affecting whether anti-icing and/or washer fluid is pumped to the dispensing components.

The system also includes one or more inputs, or triggers, to the controller for use by the controller in determining whether icy conditions exist or may be imminent.

And the inputs can include a device, e.g., sensor, and/or an input signal from such device, such as a sensor configured to determine when ice, frost, or snow is forming or to determine when conditions (e.g., freezing cold and precipitations) make such formation likely.

Another optional input is local weather information.

In one implementation, inputs provide weather information and location information, e.g., global positioning system location of the vehicle, for use by the controller to determine whether conditions are conducive to icing.

In operations, the system performs the anti-icing functions automatically in response to predetermined conditions, such as a determination that ice is forming or that conditions are conducive to icing. The functions, including dispensing the anti-icing fluid onto one or more relevant exterior surfaces, such as a windshield, side windows, a rear window, and outboard mirrors of the vehicle.

In one contemplated embodiment, the system is used to inhibit ice formation on a cover of a lamp of the vehicle, such as a headlamp, turn signal lamp, or even a sunroof, etc.

In a further embodiment, the system is configured to determine, following performance of the anti-icing functions, whether de-icing functions should be performed. The de-icing functions include applying additional anti-icing fluid and/or washing fluid to the relevant surface(s). For surfaces having one or more wipers associated therewith, the anti-icing and/or the de-icing functions can include select operation of the wiper(s).

These and other aspects of the present technology are described in further detail below with reference to the appended figures.

II. FIRST EXEMPLARY SYSTEM EMBODIMENT

FIG. 1

Now turning to the figures, and more particularly to the first figure, FIG. 1 illustrates schematically a first example of an anti-icing system according to the present technology. The system is identified in FIG. 1 by reference numeral 100. The system 100 can be an operative part of the vehicle 102.

As shown at the right of the figure, the vehicle 102 includes a windshield 104, side windows 106, external mirrors 108, forward lights 110, and a sun/moon roof 111. The lights include headlights, turn signals, fog lamps, etc.

The figure is considered to show inherently side windows other than shown, covers for rear lights (for, e.g., brake, turn, reverse lights), As further shown in FIG. 1, the vehicle 102 also includes one or more windshield wiper blades 112, a motor 114 for operating the blades 112, and one or more fluid-dispensing components, referred to primarily herein as spray nozzles.

FIG. 1 shows, as exemplary fluid dispensing component 116, two nozzles 116 for operation to clear the windshield 104. The figure also shows schematically nozzles $117^1$, $117^2$, $117^3$, $117^4$ in connection with other vehicle surfaces that the system 100 can target for clearing of frozen water (frost, ice, snow, etc.).

While the term nozzle is used, herein, the term is not used necessarily to limit the size, shape, or function of the dispensing component 116. Other potential terms for the component 116 include opening, dispensing opening, output, dispensing output, the like, or other.

The system 100 in various embodiments includes various numbers of nozzles positioned in appropriate positions adjacent respective vehicle optical surfaces. Each can be connected to the same or more than one source fluid reservoir, as described further below.

While two nozzles 116 are shown in connection with the windshield 104 in FIG. 1, for instance, and one nozzle $117^1$, $117^2$, $117^3$, $117^4$, in connection with each of the side windows 106, the mirrors 108, the lights 110, and the sunroof 111, the system 100 can include more or less; e.g., one or more than three nozzles in connection with the windshield, and more than one in connection with each of the other surfaces.

In one contemplated embodiment, at least one nozzle 116 is movable, and controllable. The nozzle could be controlled, by e.g., the controller 132 described herein and/or by operation of the fluid passing through the nozzle arrangement (e.g., analogous to the configuration and operation of a pneumatic lawn sprinkler). The potential nozzle 116 movement and benefits of the same are describe further below.

The spray nozzles 116 shown at the right of FIG. 1 are also shown at the left of FIG. 1, which provides a close-up view of certain parts of the system 100 for clarity. The close-up view further shows connection lines 118 leading to the spray nozzles 116, and other under-hood components of the system 100. The under-hood components can be completely or partially positioned under the vehicle hood, or otherwise generally internal to the vehicle 102.

The components include an anti-icing fluid reservoir 120 and a washer or washing fluid reservoir 122. Each reservoir 120/122 may be configured—e.g., sized, shaped, and arranged for positioning in the vehicle, as desired by a designer or maker of the system 100, or vehicle 102 altogether.

The anti-icing reservoir 120 is provided to hold anti-icing fluid 124, or a similar type of fluid, for use in inhibiting formation of frozen water forms—e.g., ice, frost, snow, etc., on at least one select surface of the vehicle (e.g., windshield). The fluid 124 is in some embodiments also used by the system 100 for de-icing, to remove any ice, frost, etc. that may nonetheless be formed undesirably on the select surface(s). These operations are described further below, including in connection with the algorithm sand methods of operation illustrated in FIGS. 6 and 7.

Characteristics of the anti-icing fluid 124, including its make-up and performance, is described in further detail below, entitled, Anti-Icing/De-Icing Fluid.

In a contemplated embodiment, the system 100 includes other features to facilitate management and operation of the anti-icing reservoir 120 and fluid 124, such as one or more level sensors 125, and/or other types of sensors (e.g., temperature). In one aspect, the sensor communicates by wire or wirelessly (not shown in detail) with a controller 132. The controller 132, in various embodiments, includes, is a part of, or is the computer system 300 of FIG. 3.

The washer fluid reservoir 122 is for storing washer or washing fluid 126. The fluid is referred to at times herein by the common term windshield washer fluid, but is not limited to a certain type of washer fluid, and is not limited to being used on the windshield, according to the present technology.

The washer fluid reservoir 122, like some other parts of the system 100, such as the wiper blades 112 and the spray nozzles 116, can be generally the same as that provided in current-production vehicles or state-of-the art vehicles to be designed. By using parts that are already in production, the cost of implementing the technology will likely be lowered.

The system 100 can also include, or communicate with, at least one washer fluid sensor 127, like the sensor 125 described above in connection with the anti-icing fluid reservoir 120, for use with the washer-fluid reservoir 122.

With continued reference to FIG. 1, the system 100 includes at least one pump 128 for pumping fluid, from one or more the reservoirs 120, 122 toward the spray nozzles 116, as indicated by arrow 129. Again, as a cost savings, the pump 128 can be a washer-fluid pump that would already be present or to be used in a subject vehicle at the time of implementation.

The pump 128 is communicable via a first control connection 130 with a controller 132, which controls operation of the pump. The system 100 can be configured in any of a variety of ways to facilitate communication between the pump and the controller. In one embodiment, the connection is hard-, or fixed-wired. In another, the connection 130 is wireless, wherein the pump is associated with a receiver or transceiver (not shown in detail) and the controller is associated with a transmitter or transceiver (shown by reference numeral 310 in FIG. 3).

At least one valve 134 is positioned downstream of each reservoir 120, 122, and upstream of the pump 128. The at least one valve 134 is connected to the first and second reservoirs via first and second fluid tubes 136, 138, respectively, and to the pump 128 via a third fluid line 140.

The at least one valve 134 controls whether, or to what degrees, the pump 128, when in operation, pulls from the first and/or second reservoirs 120, 122, depending on the embodiment. In some embodiments, it is preferred that the valve 134 is configured to allow fluid to flow from either of the reservoirs 120, 122, but not both. In a contemplated embodiment, the valve 134 is configured to allow fluid to flow from either, and also to equal or unequal amounts through the valve from both reservoirs simultaneously. In some embodiments, the valve 134 has a closed position.

In one embodiment the valve 134 is configured to be controlled to control a rate at which fluid is pulled from the reservoir(s).

The valve 134 communicates via a second control connection 142 with the controller, and the valve is controlled thereby, as described further below. The second connection 142, like the first, can use any of a variety of connections, including short-range wireless communications and fixed-line.

Inputs to the controller in some embodiments include any of one or more sensors 144, such as a frost sensor, and a positioning input 146, such as a local global positioning unit and input from a corresponding remote global positioning system. The inputs to the controller in the embodiments also include any of a weather input 148, providing weather data, e.g., temperature and other weather conditions (e.g., precipitation, humidity), and possibly other inputs 150. Example other inputs 150 can include other signals received by wire, or short- or long-range wireless trigger signals.

As an example of an other input 150 being a trigger received from long-range wireless signals, the input can be received from a remote control center, such as a control center of OnStar®. OnStar® includes facilities for interacting with vehicles and their users via long-range communications, such as satellite or cellular communications, or via long- and short-range communications. OnStar is a registered trademark of the OnStar Corporation.

The present technology, thus, also includes the supporting computing systems at such a control center. The center can include, for instance, a computer like that illustrated schematically in FIG. 3, for communicating with the anti-icing systems 100 in one or a plurality of vehicles 102. Operations of the center include providing the vehicles with relevant data and/or instructions. The data can include weather-related data and/or location data, as mentioned. The weather related data can be obtained by the computer system of the center via a weather service, for instance. Location data can be obtained in a variety of ways, including (i) from communicating with an on-vehicle sensor, (ii) based on timing of communication signals to/from the vehicle (e.g., triangulation), (iii) from a location of a device that is determined to be near the vehicle, such as infrastructure (a highway short-range transceiver, a restaurant WIFI® router, home or office router, etc.), another vehicle, etc.) that recently communicated with the vehicle 102. The location can also be established, e.g., by a pre-set system that registers a location of the vehicle as being in a certain vicinity when the vehicle is determined to enter the vicinity, such as a workplace parking lot having device that determines when the vehicle has arrived, such as by reading an on-vehicle RFID tag. The operations of the center computer system can also include determining, based on such data, when icy conditions exist for the vehicle (e.g., there is freezing and precipitation in the vicinity of the vehicle). The center computer system, in one embodiment, upon determining such conditions, sends a triggering instruction to the anti-icing system 100 of the vehicle 102.

II.A. Frost Sensor—First Example Control System Input

As referenced, the system 100 in some embodiments includes one or more frost sensors 144. Each frost sensor is configured and arranged for operation (e.g., positioned adjacent a corresponding surface of the vehicle) to sense whether ambient moisture is forming or has formed on the corresponding surface of the vehicle (e.g., window, mirror, or lamp cover).

The ambient moisture can come in the form of rain water, snow, or water vapor in a humid environment, for example. In one embodiment, the frost sensor is configured to sense only freezing material, such as frost, ice, and snow.

The frost sensor 144 is in various embodiments configured in various ways to determine whether frost has formed or is forming on the relevant external surface (e.g., window, mirror, etc). In one embodiment, the frost sensor 144 includes an optical device, such as a mini-camera, or an optical fiber. The optical device has a collection field, which can also be called a collection range, a field of vision, or a vision field, for example. The sensor is positioned so that the field incorporates the relevant external surface.

In connection with a window, for example, the optical device is positioned on or adjacent either surface of the window, external or internal surface, and the range of the optical device passes through the window. In one embodiment, it is preferred that the optical device be positioned on or adjacent the internal surface of the window.

The optical device is configured to determine whether visibility in the range of the device, i.e., on the relevant external surface, is occluded by frost, snow, ice, condensation, dew, etc, or to provide data to a separate device, being either a part of the frost sensor 144 or separate from and in operative communication with the frost sensor 144, such as the computing controller 132, being configured to interpret readouts from the optical device to determine whether the vision field is occluded. An occluded field, or a field occluded to a certain predetermined value or degree, indicates unwanted freezing or frozen water, whether frost, ice, snow, etc.

In one embodiment, as part of determining whether freezing water of some type is forming or formed on the subject external vehicle surface, the frost sensor 144, or device interpreting output from the frost sensor (e.g., the controller 132), compares a level of optical opacity, determined in connection with whatever is occluding the surface, to a preset degree or value of optical opacity.

In some embodiments, the frost sensor 144 in the form of an optical device (e.g., camera) measures another optical characteristic, in addition to or instead of optical opacity, being index of refraction, or refractive index. A clear visual surface (e.g., window, mirror, etc.) has a different opacity than a moisture-covered surface, and the surface covered with water (e.g., non-freezing rain) has a different opacity than the same surface with a frozen form of water (e.g., frost, ice, etc.). A window covered in non-frozen water has a lower optical opacity, e.g., than the same surface covered in ice or frost.

As referenced, in one embodiment, as part of determining whether frost, ice, snow, or etc. is forming or formed on the subject external vehicle surface, the frost sensor 144, or device interpreting readout of the frost sensor (e.g., the controller 132), along with or instead of determining optical opacity, determines an index of refraction, or refractive index, for whatever is occluding the surface and compares it to a preset index of refraction.

A clear visual surface (e.g., window, mirror, etc.) has a different refractive index than a moisture-covered surface, and the surface covered with water (e.g., non-freezing rain) has a different index than the same surface with a frozen form of water (e.g., frost, ice, etc.). A window covered in non-frozen water has a lower refractive index, e.g., than the same surface covered in ice or frost.

The optical device, or frost sensor 144, generally, can also likewise be used to determine other optical characteristics, such as transmissivity or clarity.

In one embodiment, the frost sensor 144 includes a laser, such as a semiconductor laser diode configured to emit infrared light. The laser can have specifications such as, e.g., up to 200 μW of invisible 950 nm infrared light; maximum dissipation of 200 mW, maximum current of 100 mA. The laser is used in conjunction with the optical element. Namely, the laser provides the light that is sensed by the optical element. The sensor 144, or interpreting device communicating with the sensor 144, determines the relevant value (e.g., opacity, refractive index, and/or etc.) based on the quality of the laser light that makes its way through, or is reflected by (for a mirror), the subject external vehicle surface.

In one embodiment, the sensor and/or interpreting device (e.g., processor) is/are configured to distinguish between dirt and frozen water (frost, snow, etc.).

II.B. Positioning Unit—Second Example Control System Input

As referenced above, the system 100 can include a location positioning component 146, such as a global positioning unit (e.g. GPS unit) or other such component associated with determining a location of the vehicle 102. The unit may more generally be any type of unit configured for operation in connection with a global navigation satellite system (e.g., global positioning system (GPS)) to determine a location of the vehicle 102.

In some embodiments, as referenced above, the system 100 receives location data from the a remote device, such as from the customer service center described. Correspondingly, in one embodiment, the input is not a physical device, or not completely a physical device. For instance, the input may be an application program interface (API) or other software interface configured to receive positioning data from a positioning system.

Positioning data can be received at the system 100 in a pull message, resulting from a system request sent by the system, or in a push message sent to the system without being in response to an immediately preceding pull-request from the system.

A pull-request message can be sent by the system 100 periodically, according to a pre-set schedule. The request could instead, or additionally, be sent by the system 100 intermittently, such as in response to a triggering event, such as a determination that ambient temperature outside of the vehicle 102 has dropped to a select temperature (e.g., at or near freezing), or that a certain calendar date or portion of the year has been reached.

The push message can likewise be pushed to the system 100 under any of a variety of conditions. For instance, the push message can be sent regularly, in accordance with a predetermined schedule, and/or intermittently, such as in response to a triggering event—e.g., a determination that a weather report shows freezing or near-freezing temperatures for an area in which the vehicle is expected to be, e.g., in the country, state, region, city, etc.

The position data, like all external data provided to the system 100, can be obtained, by the system 100, via short- or long-range communications. An example of short-range communication protocol is the designated short-range communication, or DSRC, protocol. Other short-range protocols include WIFI® and BLUETOOTH®.

An example long-range communication system is a cellular communication system, including data (e.g., packets) and/or voice bearing channels. Another long-range communication system is a satellite communication system.

As provided below, the position data could also be received from a source that communicates with the vehicle 102, to obtain signals from the vehicle and return more-useful calculated location information, such as OnStar®, referenced above, and described further below.

The positioning information, whether generated local to the vehicle 102 and/or remote to the vehicle, can be in any one or more of a variety of formats. In one aspect, the information is in the form of coordinates, such as latitudinal/longitudinal coordinates. In another aspect, the information is in the form of a geographic indicator, such as a region of the world—e.g., state, county, city, metropolitan area, portion of a state, etc.

In another, contemplated aspect, the location information indicates a pre-determined geographic zone. In this example, a geographic region, such as a country or state can be divided into one or more zones, which may or may not correspond to common geographic boundaries for the region, and the information indicates in which of the zones the vehicle is positioned.

II.C. Weather Input to Control System Input

The weather-related input 148 includes at least one component and/or a signal from the component, being remote or local. The component in various embodiments includes hardware and/or software.

In one embodiment, the weather input 148 includes one or more sensors for determining any or all of ambient air temperature, surface temperature (e.g., window temperature, mirror temperature, etc.), ambient air humidity, and whether there is precipitation.

In one embodiment, the weather input 148 includes an API or other software interface configured to receive weather data, such as from a weather system.

An example weather system, which can be local to or remote to the system 100, is an existing local, regional, national or international weather service. The weather data can be received from such service in a pull message, resulting from a system 100 request sent to the service, or a push message.

The request can be sent by the system 100 periodically, according to a pre-set schedule. The request could instead or additionally be sent by the system 100 intermittently, such as in response to a triggering event, such as a determination that ambient temperature outside of the vehicle 102 has dropped to a select temperature (e.g., at or near freezing) or that a certain calendar date or portion of the year has been reached.

The push message can likewise be pushed to the system 100 in any of a variety of similar ways. For instance, the push message can be sent regularly, in accordance with a predetermined schedule, and/or intermittently, such as in response to a triggering event—e.g., a determination that ambient temperature outside of the vehicle 102 has dropped to a select temperature (e.g., at or near freezing).

The data from the weather service, like all external data provided to the system 100, can be obtained, by the system, via short- or long-range communications. An example of short-range communication protocol is the designated short-range communication, or DSRC, protocol. Other short-range protocols include WIFI® and BLUETOOTH®.

Example long-range communication systems comprise cellular communication systems, including data (e.g., packets) and/or voice bearing channels, and satellite communication systems.

The weather data can be received from an Internet source, such as a web page or web feed. An exemplary web feed as a rich site summary (RSS; also often referred to as a really simple syndication).

Weather data may be received from a source that is not dedicated to providing solely weather information, such as the OnStar system referenced above.

II.D. Other Inputs to Control System Input

As referenced above, the system 100 can include one or more other inputs 150, in addition to the inputs described above, or instead of any one or more of the above-described inputs, for use in performing the functions of the present technology.

For embodiments in which positioning and/or weather data is received from a device or source other than a service control center, the other inputs 150 can include input from such as center—e.g., OnStar®, which is referenced above.

In one embodiment, data from the other input(s) 150 is used in conjunction with data received from other sources (e.g., temperature sensor as the weather-related sensor 148).

III. SECOND EXEMPLARY SYSTEM EMBODIMENT

FIG. 2

Figure 2:
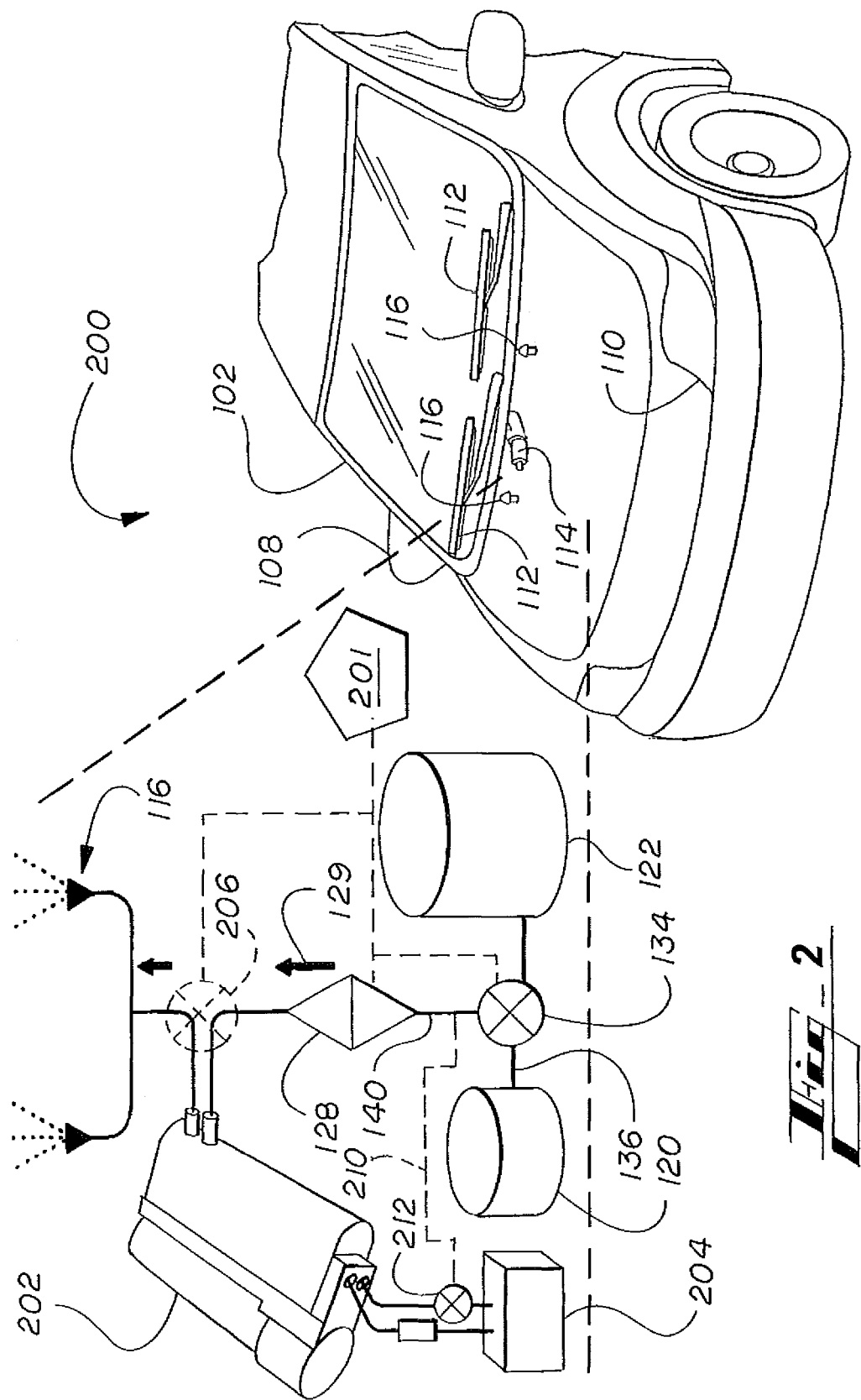
FIG. 2 illustrates a second exemplary anti-icing system according to the present disclosure.

FIG. 2 illustrates schematically an anti-icing system 100 in accordance with other embodiments of the present disclosure.

III.A. System of FIG. 2 Vis-à-Vis System of FIG. 1

The system 200 can be in many ways identical and/or similar to the system 100 shown and described above in connection with FIG. 1. This relationship is indicated by the use in FIGS. 1 and 2 of common reference numbers to refer to like parts.

One similar aspect is the control subsystem indicated by reference numeral 201 in FIG. 2. This reference corresponds generally to the control features illustrated in the same area of FIG. 1, including the controller 132, the frost sensor 144, the positioning input 146, the weather input 148, and the other possible inputs 150. Distinctions between the sub-system 201 of the system 200 of FIG. 2 and the features of the system 100 of FIG. 1 are described below.

Nonetheless, while like parts are indicated by the same reference numbers in FIGS. 1 and 2, parts of the system 200 shown in FIG. 2 can be different in one or more ways than the analogous parts of FIG. 1. For instance, while the spray nozzles of each system 100, 200 are indicated in both figures by reference numeral 116, the nozzles of each can be customized to particular goals of the respective system 100, 200 in a way causing them to be distinct in one or more ways from those of the corresponding system 200, 100.

As an example, the controller, of the controlling sub-system 201, is configured in the example of the second system 200, to perform operations including those specific to the second embodiment. The specific operations include, e.g., and as described further below, determining whether and when a triggering condition exists warranting initiation of a micro-heating cycle by which fluid is heated before being applied to the subject surface(s). The distinction can be in controller hardware and/or software, such as the computer-executable code or instructions 308 described below in connection with FIG. 3 for both systems 100, 200.

As another, contemplated, example, a designer of one or both systems 100, 200, according to the present technology, may determine that the nozzles used in connection with the second system 200 should be slightly or markedly different from the nozzles of the first system 100, such as in order to better disperse the heated fluid of the second embodiment.

Similar customizing can be performed in connection with each feature common between the systems 100, 200 in part selection or manufacturing of either or both systems 100, 200.

III.B. Heating Element

A primary distinction between the first and second exemplary systems 100, 200 is that the second system includes a heating element 202. The heating element is configured and arranged in the vehicle 200 to selectively fluid received at the element 202.

In one embodiment, the heating element 202 is referred to as a micro-heating element. The name can be applicable under any of various reasons, such as (i) the element being relatively small in size compared to the vehicle 200 or parts or systems of the vehicle, (ii) the heating of fluid performed by the element being on a small scale, generally, or (iii) relative to other heat-transfer processes occurring in the vehicle 200, such as an amount of heat produced by the vehicle engine or primary motor, or (iv) other.

The heating element 202 is connected to a power or energy source 204. The source 204, in some embodiments is or includes one or more common vehicle batteries of the vehicle. In one embodiment, the power source 204 is distinct from the conventional vehicle battery or batteries. For example, the source 204 is a stand-alone battery power source. The power source is in some embodiments rechargeable.

III.C. Heat-Selecting Valve

In a contemplated embodiment, the system 200 includes a valve 206 controlling whether fluid is channeled to the micro-heating element 202 or channeled to by-pass the heating element 202. Without the valve 206, flow would pass through the heating element 202 whether the element 202 is turned on to be heating the fluid.

The valve 206 can be referred to by certain names, such as a heat-control valve, heat-selecting valve, heat by-pass valve, heating valve, heat valve, heat selector, by-pass selector, similar, or other.

The control valve 206 is in some embodiments not present.

In one embodiment, the heat-selecting valve 206 has a single input and two outputs (not shown in detail). The input of the heat-selecting valve 206 is connected, e.g., by fluid line(s), and any intervening parts—e.g., pump 128 and/or first valve 134—to the reservoir(s) 120/122.

One of the heat-selecting valve 206 outputs is connected by fluid line, or directly, to the heating element 202. The other output of the valve 206 is connected directly or by fluid line to the one or more corresponding dispensing nozzles.

In a further contemplated aspect, the valve 206 is configured to allow some fluid, received at the valve 206 to pass through the heating element 202 and some of the fluid to by-pass the heating element 202. A result of this embodiment is that the valve 206 can be used effectively to control a resulting temperature of the fluid that is introduced, via the nozzle(s) 116, to the corresponding surface (e.g., windshield).

That is, the temperature can be controlled to be between a maximum temperature, being a maximum temperature that the heating element 202 is able to heat the fluid and a minimum being the temperature of the fluid received at the valve 206, based on the amount of fluid that the valve 206 channels through the heating element 202 and the amount that by-passes the heating element to be combined with the heated fluid, if any, downstream of the valve 206.

In most embodiments, the fluid heated is the washer, or washing, fluid as part of dispensing it to the surface. It may be useful, to also or instead heat the anti-icing fluid.

For embodiments in which the heating element 202 is adjustable to heat the fluid to various degrees, another way to control the temperature of the fluid being introduced to the surface is to control operation of the heating element 202 accordingly. FIG. 2 shows a connection 210 between the automated control sub-system 201 and the heating element 202. The connection can include a switch or regulator 212. By these means, the controller can control the circuit involving the heating element 202.

The heat-selecting valve 206 is also configured for operative, selective, communication with the controller 132 (of the control sub-system 201) As with the other connections described herein, between system 100/200 components and the controller 132, the connection can be wired or wireless. The controller controls position of the valve 206, thereby controlling the amount of fluid channeled to and channeled to by-pass the heating element 202.

This second valve 206 can include any feature described herein in connection with the first valve 134, and vice-versa. For instance, in some embodiments, the valve 206 has a closed position whereby no fluid passes through the valve 206, as is the case for the first valve 134.

IV. CONTROLLER

FIG. 3

FIG. 3 illustrates an example computer system 300 for use in performing the operations of the present technology. The controller 132 of the general system 100, 200 described in connection with FIGS. 1 and 2, include, be a part of, or be the computer system 300 of FIG. 3.

The system 300 can also be a part of, or separate from, an existing primary or ancillary control system in the vehicle, such as an electronic control unit (ECU) of the vehicle.

The system 300 includes a memory, or computer-readable medium 302, such as volatile medium, non-volatile medium, removable medium, and non-removable medium.

The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The computing system 300 also includes a computer processor 304 connected or connectable to the computer-readable medium 302 by way of a communication link 306, such as an intra-computer communication bus.

The computer-readable medium 302 includes computer-executable instructions 308. The computer-executable instructions 308 are executable by the computer processor 304 to cause the processor, and thus the computing system 300, to perform all or any combination of the functions described in the present disclosure, including those described above and those described below in connection with FIGS. 6 and 7.

The computer-executable instructions 308 can be arranged in one or more software modules. The modules can be referred to by the operations or operations that they cause the computer processor 304 to perform.

For instance, a module including instructions that, when executed by the processor 304, cause the processor to perform an operation of determining that a trigger condition to commencing an anti-icing operation and, in response to the determination, initiate commencement of the anti-icing operation can be referred to as a trigger module, an anti-icing initiation module, an anti-icing commencement module, an initiation module, a commencement module, or the like.

Similarly, a module causing the computer processor to perform an operation of comparing an ambient temperature to a pre-set temperature can be referred to as a temperature module, a temperature-comparison module, or the like.

All such module names are not explicitly called out herein, but are considered disclosed inherently by the present description, and so supported for reasonable recitation in the claims.

The term software, or variants thereof, is used expansively herein to include routines, program modules, programs, components, data structures, algorithms, and the like. Software modules can be implemented on various system configurations, including servers, network systems, single-processor or multiprocessor systems, minicomputers, mainframe computers, personal computers, hand-held computing devices, mobile devices, microprocessor-based, programmable consumer electronics, combinations thereof, and the like.

The computer processor 304 is also connected, such as via the bus 306, or connectable to at least one interface 310 for facilitating communications, between the computer system 300 and input and output (i/o) components 312. As with all parts of the system 100 and vehicle 102, while a single schematic item is shown for the interface 310, more than one can be inferred there from for some embodiments.

For communicating with the i/o components 312, the interface 310 includes one or both of a short-range transceiver and a long-range transceiver. The output components of the input/output components 312 (or, i/o components) include the controllable components of the system 100, 200, such as the valves 134, 206, the pump 128, and the heating element 202. The input components of the i/o components 312 can include, e.g., aspects of any of the controller inputs described herein, such as the inputs 144, 146, 148, 150, described above in connection with FIG. 1 and incorporated into FIG. 2 at block 201.

Components 312 can be local to the system 100, 200 and/or remote to the system. The components 312 can include databases, servers, other processors, other storage mediums, and/or other computing devices.

The interface 310 can include a transmitter, receiver, or transmitter that is wired and/or wireless-based for supporting wired and/or wireless protocol communications, respectively. Local, wired, i/o components 312, are indicated in FIG. 3 by superscript 1, (i.e., $312^1$) and remote, wireless, i/o components are indicated in FIG. 3 by superscript 2 (i.e., $312^2$). Similarly, as provided, the system 100, 200 can be configured so that the controller 300 communicates wirelessly with one or more local i/o components 312.

V. SURFACE COVERAGE

Figure 5:
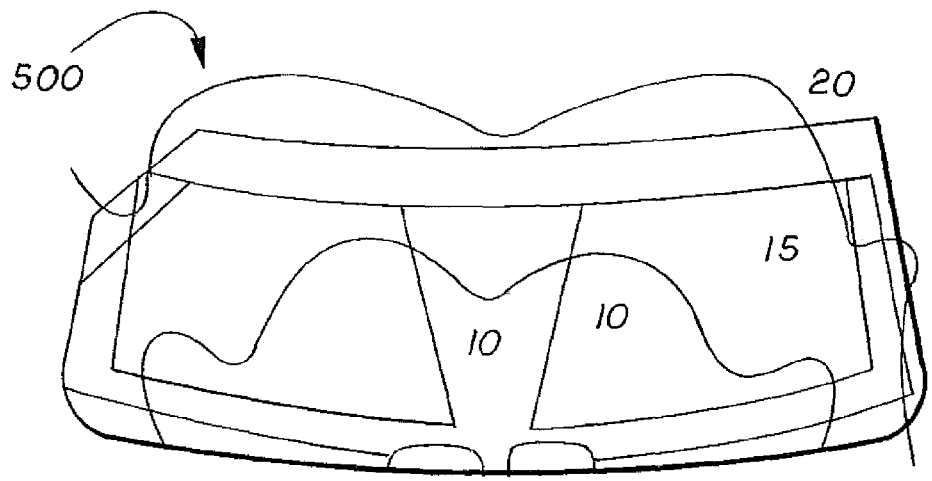
FIG. 5 illustrates a windshield, again, having various portions called out similarly as variables for consideration in configuring the system, according to an embodiment of the present disclosure.

FIGS. 4 and 5

As provided, the nozzles 116 can be sized, shaped, positioned, and directed in any of a wide variety of ways within the scope of the present technology. Generally, settings for these characteristics are selected by a designer or maker of the system 100, 200, or the vehicle 102, in accord with the present disclosure, in a manner so that the anti-icing fluid, and washing fluid, will be dispensed on the subject service as desired.

It may be, for instance, that a desired area of coverage by the anti-icing fluid is an entirety of the surface. It may be, though, that only a portion of the surface is desired for coverage. In most instances, a hybrid of these requirements is the case, whereby there is a priority to cover a portion of the surface, such as a primary area of the surface through which the driver will look, and also an ancillary desire to cover more of the surface. The ancillary coverage is not in as much of a crucial area, but would still be helpful to vehicle operation if the ancillary area was clear of frost, ice, snow, etc.

In addition to the coverage consideration, and in conjunction with it, the system 100, 200 may be configured with consideration given to a timing factor. In some embodiments, the system 100, 200 is configured so that the anti-icing fluid will take effect in, and mostly clear, higher-priority areas before less-important areas.

In addition, in connection with priority areas, the system 100, 200 may be configured so that at least a respective minimum amount of clearance is accomplished in each area. The amounts can be measured and evaluated, for instance by a percentage of clarity, e.g., a percentage of clearness of view between 0% being fully blocked, or opaque, and 100% being fully clear. The amount can be measured and evaluated in terms of any of the metric described herein, including refractive index, transmissivity, optical clarity, etc.

V.A. First Example Coverage Considerations

FIG. 4 illustrates an example surface 400, being a view of a windshield, like the windshield 104 of the vehicle 102 of FIG. 1.

While a windshield is shown in FIGS. 4 and 5 by way of example, it will be appreciated that the concepts described herein in connection with the figures can be applied likewise to any subject surface, such as a side vehicle side window (e.g., the window 106 in FIG. 1), a rear vehicle window, an exterior vehicle mirror (e.g., the mirror 108), a vehicle lamp cover (e.g., rear, turn-signal, or headlamp such as the light cover 110), etc.

The view of the example windshield in FIG. 4 is taken from an interior perspective of a left-side drive vehicle, or from an exterior perspective of a right-side drive vehicle.

The figure highlights three primary areas 402, 404, 406 by way of example. Two other, less important, areas 408, 410 are also shown, and described below. A designer or maker of the system 100, 200 can consider more or less areas.

The first area 402 is central and most-critical to the driver's directly-forward-looking line of sight. It will be appreciated that this is the most important area of the windshield to be cleared.

The second area 404 is also in front of the driver, covering a primarily used portion of the windshield, on the driver side of a centerline 412 of the surface 400. The third area 406 covers a primary portion of the windshield on the passenger side, opposite the windshield centerline 412 from driver side.

Turning to the even-less important areas of the example windshield, the fourth area 408 is on the driver's side of the centerline 412, but above, below, and/or next to the primary forward looking line of sight. The fifth area 410 is similar, but even less important, being on the passenger side of the centerline.

The system 100, 200 can be configured to clear the higher-priority areas the most, first, etc. For instance, the system 100, 200 can be configured to clear the first area 402 the most, and possibly also first, as compared to the other areas.

The system 100, 200 configuration can be made with consideration given to variables including those referenced above, such as number of nozzles 116, size, shape, positioning, direction of each nozzle, the like, and other. Variables can also include volume of anti-icing fluid dispensed, when dispensed, for how long, and, for the second example system 200, a temperature of the fluid dispensed.

In one embodiment, each nozzle 116 is positioned toward an edge of the relevant surface. And, generally, each 116 is positioned to that it is not blocking the optical path(s) (line of sight or line of light) through the surface, or such that the path(s) is least obstructed.

As an example of positioning flexibility one of the headlamp nozzles $117^3$ in FIG. 1 is shown positioned toward a lower inside corner of the lamp, while the other $117^3$ is shown positioned bottom, center, of the lamp. The nozzles 116 could be positioned elsewhere, such as at top center or top corners of the lamp 110. Similar nozzle-positioning flexibility exists for each subject surface of the vehicle 102.

The system 100, 200 is configured so that the second area 404 can be given a second priority, behind the first area 402 in importance, and the third area 406 a third priority behind the first two. In one embodiment, for instance, the system is configured so that clearing of the second area 404 is completed, if at all, after clearing of the first area 402 is completed, whether the areas are cleared simultaneously, in part (e.g., clearing of first area first followed by clearing of both areas) or in full, or are cleared in series (i.e., first area first, then the second area, or then the second and third areas, etc.).

Lower-priority areas can also be cleared in a manner ancillary to the clearing of one or more higher areas. For example, nozzle 116 output can be directed at the first area 402 in such as way that the first area receives a majority of the output and the second area receives some but less of the output. As another example, the nozzle 116 can be movable and controlled (e.g., by the controller 132), as referenced above, so that fluid is provided to higher priority areas first, in greater quantities, more frequently during an anti-icing cycle, etc.

As described above, the system 100, 200 is in some embodiments configured with consideration given to a target clearance value to be reached for one or more of the areas. As provided, the value can be, e.g., a percentage of clarity, such as a percentage of clearness of view between 0% being fully blocked, or opaque, and 100% being fully clear, a refractive index, transmissivity, optical clarity, the like, or other.

In some embodiments, the system 100, 200 is configured so that two different areas, e.g., the second and third areas 404, 406, are given similar treatment in one or more ways. The system 100, 200 can be configured, e.g., so that two areas are cleared to the same minimum clearance level and/or cleared to the target point within the same amount of time.

With reference to the primary three areas shown in FIG. 4, the system 100, 200 can be configured to meet clearance goals, measured, e.g., by percentage. The goals can correspond to requirements of an authority, such as a governmental authority.

As an example, in one embodiment the system 100, 200 is configured to meet percentage-clearance goals of about 95% for the first area 402 and about 80% for each of the second and third areas 404, 406. Higher or lower percentages can be used instead for each area. As provided, such goal can be applied to other areas, such as the fourth and fifth areas 408, 410 called out in FIG. 4.

In a second example embodiment, the system 100, 200 is configured to meet clearance-timing goals of clearing the first area 402 to a target level of clearance within 20 minutes, clearing the second area 404 within 25 minutes, and clearing the third area 406 within 40 minutes. Higher or lower time frames can be used in connection with each area.

In a third example embodiment, the system 100, 200 is configured to meet timing-of-clearance goals, representing how long clearing is performed, of the first area 402 for 45 minutes, the second area 404 for 25 minutes, and clearing the third area 406 within 20 minutes. Again, higher or lower time frames can be used in connection with each area.

As provided, various variables can be considered together in designing and making the system 100, 200. For instance, combing the first and second example embodiments in the preceding paragraphs, the system can be configured so that, e.g., the first area 402 is cleared to a level of 95% clearance within 20 minutes, the second area 404 is cleared to a level of 80% clearance within 40 minutes, etc.

V.B. Second Example Coverage Considerations

FIG. 5 shows another breakdown of a surface 500, e.g., windshield like that of FIGS. 1 and 2.

FIG. 5 shows sketched ice melting fronts on a windshield at various elapsed time in minutes. The numbers in the sketch are example elapsed times to clear the ice after the engine and defrost system are turned on.

Like FIG. 4, FIG. 5 includes various areas that a designer or maker of the system 100, 200, according to the present disclosure, or installer of the system on a vehicle 102, can consider in designing, making, and/or installing the system. For instance, as described above in connection with FIG. 4, the system can be configured with consideration given to the areas wherein the areas are assigned relative priorities for being cleared.

The nozzles 116 can be positioned, directed, etc., and the controller programmed so that at least one area of those shown in FIG. 5 receives anti-freezing fluid 124 in a manner different than one or more of the other areas shown in FIG. 5. The differing manners, as provided, can include different timing of fluid application, different amounts of fluid, etc.

Other concepts described herein, including in connection with FIG. 4, can be applied in connection with the areas of FIG. 5, such as the manners of fluid application to the various areas being dependent on different respective triggers.

VI. ANTI-ICING/DE-ICING FLUID

The anti-icing fluid 124 can have any of a wide variety of formulations without departing from the scope of the present disclosure. While the fluid 124 is referred to herein primarily as anti-icing fluid, the term is primarily for convenience of description. The fluid 124 may be a fluid referred to, such as by a maker, producer, or provider of the fluid by other names, for example, such as fluid, liquid, or the like, in connection with anti-frost, anti-freezing, frost-free, ice-free, freeze-free, de-icing, de-icer, de-frost, de-freeze, ice-control, frost-control, similar, or the like.

Only by way of example, the anti-icing fluid 124 can include SPC-3000, available from SynTech Products, of Toledo, Ohio. The fluid 124 can include any of the characteristics of such products, as available at the time of filing of the present application, and/or as such products are improved or otherwise changed over time.

According to syntechproducts.com at the time of the present filing, SPC-3000 is environmentally friendly, being safe enough to use on plants as well as agricultural vegetation and is non-corrosive to all common metals. The product is further marketed there as being: composed primarily of materials derived from the processing of starches and sugars making it economical and readily available; nontoxic; and non-hazardous to plant and animal life.

SPC-3000 is also there described as: biodegrading in the environment readily and completely to carbon dioxide and water; having a low Biological Oxygen Demand (BOD); and containing no phosphates or urea; and containing no chloride salts. The products is further marketed for use both as a deicing agent to melt ice deposits and aid in their removal, and as an anti-icing agent to prevent frozen accumulation where desired. The description at the website refers primarily to road surface uses (e.g., de-icing a bridge), and references household use, and use on sidewalks.

Another exemplary fluid 124 was developed at the NASA Ames Research Center. This fluid, once referred to as ICE FREE contains food-grade ingredients, making it safe for the environment.

The anti-freezing fluid can be selected to inhibit ice formation or remove ice already bonded to the surface(s) down to a certain temperature, such as all the way down to about −20 degrees Fahrenheit, or other very-low temperature.

As described above in connection with system 100, 200 configurations, and further below in connection with the operations of the methods illustrated in FIGS. 6 and 7, the systems 100, 200 are in various embodiments designed to apply the anti-icing fluid 124, and the washer fluid 126, at any of various timings, amounts, intervals, etc.

Regarding timing, for instance, the fluids can be applied in response to any one or more of a variety of triggering events, including receipt of a predetermined signal from a weather-related sensor such as a temperature or freeze-detection sensor, a weather report, geographic data, customer-service sensor message, the like, and other.

In one embodiment, the system 100, 200 is configured to apply anti-icing fluid 124 prior to freezing of water, liquid or gas (e.g., vapor, like that humid air), on the respective surface(s). The trigger in such cases can be a detection of water on the surface(s) in conjunction with a determination that ambient conditions are conducive to freezing or such conditions are imminent or likely within a predetermined degree (e.g., 80% likelihood of freezing a condition).

In some embodiments, such as for situations in which freezing conditions set in quickly or before being identified by the system 100, 200, the system 100, 200 can apply the anti-freezing fluid 124 following bonding of some freezing water (e.g., ice, snow, or frost) on the surface. The anti-freezing fluid thus also in some embodiments is configured to also thaw already-formed ice on the surface.

VII. EXEMPLARY ALGORITHMS AND METHODS OF OPERATION

Figure 6:
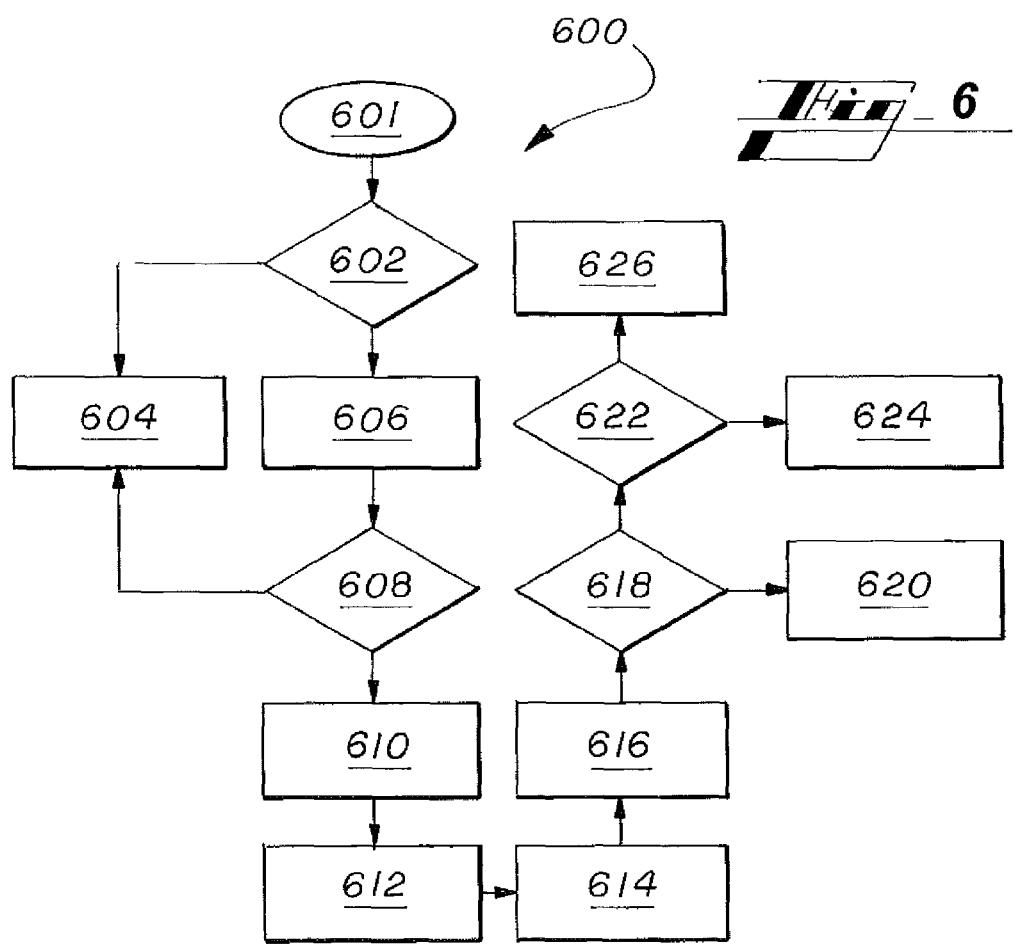
FIG. 6 illustrates a method for using the first exemplary system, shown in FIG. 1, to inhibit formation of frozen water (e.g., frost, ice, snow, etc.) on a vehicle surface or de-ice the surface, according to an embodiment of the present disclosure.

FIGS. 6 and 7

FIGS. 6 and 7 illustrate in flow-chart format exemplary algorithms and corresponding methods 600, 700 for inhibiting formation of frozen water forms (e.g., frost, ice, snow, etc.) on a surface, such as a surface of a vehicle (e.g., vehicle 102 of FIGS. 1 and 2), and removing or thawing any frozen material that may have already bonded to the surface, according to an embodiment of the present disclosure. The method 600 also includes further cleaning of the window, such as by operation of wipers.

It should be understood regarding the present description that the operations or steps of the methods 600, 700 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated methods 600, 700 can be ended at any time.

In certain embodiments, some or all steps of the algorithm, and/or substantially equivalent steps are performed by a controller, such as a processor, e.g., computer processor, executing computer-executable instructions stored or included on a computer-readable medium, such as execution by the processor 304 of the code 308 of the memory 302 of the systems 100, 200 described above.

VII.A. First Exemplary Algorithm and Method—FIG. 6

The algorithm and method 600 illustrated in FIG. 6 are configured primarily for use in connection with the arrangement of the first exemplary system 100, but may be used at least in part in connection with the second example system. The second exemplary algorithm and method 700, described below in connection with FIG. 7, is geared to features particular to the second exemplary system 200.

The algorithm and method 600 of FIG. 6 begin 601 and flow proceeds to decision diamond 602, whereat the processor (e.g., processor 304) determines whether the vehicle 102 is parked. In one embodiment, this operation involves determining, via appropriate connections to the ECU or transmission system, whether the vehicle is in the parked gear.

If the vehicle is not parked, in one embodiment, flow proceeds to block 604, whereat no action is taken. As provided, the method 600 may be repeated as needed.

If the vehicle is parked, flow of the algorithm proceeds to block 606, whereat the processor initiates activation of, obtaining of readouts from, any local sensors or routines of the system 100, 200 used to determine whether a condition triggering initiation of an anti-freezing cycle is present. An example sensor here is a frost sensor, and an example routine here is a routine by which the system sends a request for weather and/or vehicle location, such as via a GPS unit at the vehicle.

At decision diamond 608, the processor determines whether any of one or more predetermined trigger conditions is present. As provided above, the trigger conditions can include receiving a signal from a temperature, rain, and/or frost sensor indicating that a freezing condition is present or imminent. Another example trigger condition involves receiving a weather report, such as from a local, regional, national, or international weather service, associated with a location of the vehicle 102 indicating that a freezing condition is present or imminent. In this case, the processor may also process location information received from a locating system onboard the vehicle and/or remote, indicating that the vehicle is positioned in the area corresponding to the freezing or near-freezing condition.

Still another example trigger condition involves receiving a trigger to begin an anti-icing cycle from a customer service center, such as OnStar, also described above. As also provided, the system 100 and vehicle 102 can be configured so that data received from on-vehicle sources can be received to the controller 132, via the interface 310, via wired or wirelessly, such as using the BLUETOOTH protocol. And, as provided, the system 100 and vehicle 102 can be configured so that data received from remote-to-vehicle sources can be received to the controller 132, via the interface 310, via wired or wirelessly, such as using the WIFI, cellular, satellite, BLUETOOTH, or other wireless formats.

For some embodiments in which a weather forecast is being relied upon for identifying a frost potential, the system is configured to determine whether the vehicle is parked in protected area, such as in a garage or car porch. The vehicle being parked as such is considered in determining whether to activate the system, and may cause the system not to activate, with the assumption that snow, rain, and even frost would not be forming on the vehicle parked as such. In cases in which the vehicle also has frost sensors, or the like, the vehicle can confirm whether any frozen material is present.

The vehicle can be configured to determine whether the vehicle is parked in such a protected area in any of a variety of ways without departing from the scope of the present disclosure. The vehicle can use, e.g., any of one or more camera sensors, radar sensors, light-sensitive sensors, and location data. In one embodiment, the vehicle receives a signal or indication, such using an RFID tag, on the vehicle or associated with the protected area, or from a local WIFI or BLUETOOTH router near or associated with the protected area, indicating to the vehicle that it is located in the protected area.

Returning to referencing FIG. 6, if no trigger condition is met, e.g., a freezing or near-freezing condition is not determined present or imminent, then flow of the algorithm proceeds to afore-mentioned block 604, whereby again the anti-icing cycle is not initiated. As provided, the method 600 may be repeated as needed.

If at diamond 608, a triggering condition is determined present, flow of the algorithm proceeds to commence the anti-icing cycle, including, at block 610, the processor initiating changing of the control valve 134 to an anti-freezing position whereby a path is opened between the anti-freezing fluid reservoir 120 and the pump 128. If the valve 134 is already set in this way before the step 610 is reached, then the operation 610 can include the processor simply proceeding in the algorithm to block 612, or first determining, or ensuring, that the valve 134 is set as such and then proceeding to block 612.

At block 612, the processor initiates starting of the pump 128. For embodiments in which the pump 128 is connected directly to the nozzles 116, 117, such as by fluid lines with no intervening components blocking flow, then starting of the pump 128, along with the valve 134 being open to the anti-freezing reservoir 120, results in the pump pumping the anti-freezing fluid from the reservoir to and through the nozzles. In this way, fluid is dispensed on the subject surface(s) (e.g., windshield, side window, mirror, lamp cover, and/or etc.). It will be appreciated that the dispensing is at a rate and volume determined by system 100 features, such as force and size of the pump, size of the fluid lines, size and shape of the nozzles, the number of nozzles to which the anti-fluid flow from the pump is split to, etc.

The anti-icing fluid is dispensed according to pre-determined settings. The setting may include, e.g., total time of cycle, spaced intervals, a volume of anti-icing fluid to be applied, the like, and/or other. The settings can also include controlling of position of the nozzles in embodiments in which the nozzles are movable and controllable, as described above.

In one contemplated embodiment, the settings include a repeat sub-cycle whereby the system checks for icing immediately after and/or at one or more intervals after a last application of anti-icing fluid to determine whether another application should be made.

Following application of the anti-icing fluid according to the settings, flow proceeds to block 614, whereat the system 100 awaits a next start of the vehicle. As provided, during this wait period, the settings may call for re-applications of the anti-icing fluid. This may be the case, e.g., if the first application was provided in connection with a first triggering event, e.g., snowing instance, and a re-application is needed in response to a determined second triggering event, e.g., a heavier or later snowing or icing condition. Reapplication is especially useful in cases in which the net vehicle start of block 614 is not for a long period of time after the last application of block 612, and inclement weather continues, the same or escalated, or stops and returns.

In response to the next vehicle start, at block 616, the processor initiates activation of any wiper system that may present, such as windshield wipers 112 or headlamp wipers (not shown) to clear any material or residue that may be on the respective surface—e.g., windshield or headlamp cover. In some embodiments, the decision 618 is performed by the vehicle driver, around the time of starting the vehicle, e.g., in the morning.

At diamond 618, the processor determines whether there is any leftover frozen material, such as frost or ice, on the surface(s). This operation can include obtaining readings from one or more sensors, such as the frost sensor, an optical clarity sensor, or any of the sensors described herein. As with step 616, in some embodiments, the decision 618 is performed by the vehicle driver, around the time of starting the vehicle, e.g., in the morning. The driver can see whether the windows and mirrors are clear enough for them. Regarding the lights (e.g., head lamps), and whether they are clear, the driver can look before entering the vehicle or rely on vehicle sensor readouts.

In any event, a precautionary or extra cleaning can be performed, whether in reply to any determination of remaining unwanted frozen material. If the driver is not satisfied with the cleaning at step 618, e.g., she notices some left over ice or frost on the windshield, then she can take further actions—e.g., apply a further cleaning cycle (fluid squirt and wiper wipe). As described further below, the cleaning fluid can be chosen by the system or driver either as regular fluid or anti-icing fluid depending on the ambient temperature compared to the set temperature.

If at decision 618, it is determined that there is no frozen residue, then flow proceeds to block 620, whereat the present anti-icing cycle is determined successful and complete. As provided, the method may be repeated as needed.

In one embodiment, any of the operations can be performed in connection with one or more of multiple subject surfaces without being performed in connection with others of the surfaces. Select performance can depend on the circumstances. For instance, if at decision 618 it is determined that some ice residue is on the front lamp covers 110, but not on the windshield, then the flow can continued to present completion block 620 only in connection with the windshield, and continue to decision 622 in connection with the lamp covers, or just with respect to one if appropriate. Similar selective action is possible in connection with the re-performance of anti-icing fluid application determined needed in connection with the fluid application operation 612 according to the afore-described settings.

As provided, the operations or steps presented can be performed in any order and one or more steps can be removed. As a present example, in one embodiment, decision 622 is not present. In that case, steps 626 and/or 624 would be present as an option(s) to follow.

If at decision 618, it is determined that there is frozen residue is present on the surface(s), then flow proceeds to decision diamond 622, whereat the processor determines whether an ambient temperature is greater than a pre-set temperature. The ambient temperature is obtained from, e.g., a vehicle temperature sensor or a weather report. In one embodiment, the decision 622 is not preset, and fluid (e.g., anti-icing fluid) is applied in response to a determination that some undesired frozen material is present.

While the pre-set temperature can be selected by a designer or maker of the system 100 as they see fit, depending, e.g., on target levels of surface clarity, in one embodiment the pre-set temperature is about the freezing point of water. In one embodiment, the pre-set temperature is slightly above, e.g., a degree or a few degrees higher, than the freezing point.

In response to determining at decision 622 that the ambient temperature is greater than the pre-set temperature, then flow of the algorithm proceeds to block 624, whereat the processor initiates a washing cycle. The system 100 can be configured to perform the washing cycle having any of a variety of characteristics without departing from the scope of the present technology. The washing cycle can include, e.g., an application of the washing fluid 126 to the surface(s). It will be appreciates that applying washing fluid includes controlling at least the valve 134 and pump 128 accordingly.

Responsive to determining at decision 622 that the ambient temperature is not greater than the pre-set temperature, then flow of the algorithm proceeds to block 626, whereat the processor initiates another anti-icing cycle, such as described above in connection with block 612. In one embodiment, this re-application is only performed if the processor, or driver, determines again that the vehicle is parked. And, again, the process 600 or any steps thereof can be repeated.

VII.B. Second Exemplary Algorithm and Method—FIG. 7

The algorithm and method 700 illustrated in FIG. 7 are configured primarily for use in connection with the arrangement of the second exemplary system 200 (FIG. 2), operation of the first system 100 (FIG. 1) being addressed primarily above in connection with the algorithm and method 600 of FIG. 6.

The algorithm and method 700 of FIG. 7 are in many ways like those of FIG. 6. Operations that can be, but need not be, exactly or nearly the same between the two, are in most or all cases indicated by similar reference numeral. For instance, commencement step 601 of FIG. 6 is like that 701 of FIG. 7, the consideration at decision diamond 602 of FIG. 6 is like that 702 of FIG. 7, etc. Further, to note the possible relationships, and for efficiency of disclosure and ease of reading, the description below for FIG. 7, in most or all places of commonality, indicates the commonality between FIG. 7 and FIG. 6 and/or represents, in connection with the FIG. 7 operation, the same or similar disclosure in connection with the analogous operation of FIG. 6.

The algorithm and method 700 begin 701 and flow proceeds to decision diamond 702, whereat the processor determines whether the vehicle is parked. This operation 702 can be like that 602 described above in connection with FIG. 6, and so is not described further here.

If the vehicle is not parked, in one embodiment, flow proceeds to block 704, whereat no action is taken. As provided, the method may be repeated as needed.

If the vehicle is parked, flow of the algorithm proceeds to block 706, whereat the processor initiates activation of, or initiates obtaining of readouts from, any local sensors or routines of the system 100, 200 used to determine whether a condition triggering initiation of an anti-freezing cycle is present. This operation 706 can be like that 606 described above in connection with FIG. 6, and so is not described further here.

At decision diamond 708, the processor determines whether any of one or more predetermined trigger conditions is present. This operation 708 can be like that 608 described above in connection with FIG. 6, and so is not described further here.

If no trigger condition is met, e.g., a freezing or near-freezing condition is not determined present or imminent, then flow of the algorithm proceeds to afore-mentioned block 704, whereby again the anti-icing cycle is not initiated. As provided, the method 700 may be repeated as needed.

If at diamond 708, a triggering condition is determined to be present, flow of the algorithm 700 proceeds to commence the anti-icing cycle, including, at blocks 710 and 712. In one contemplated embodiment, one or more fluid applications in these steps includes controlling the second valve 206 (FIG. 2) and the heating element 202 to heat some or all of the fluid applied in the dispensing to the applicable surface(s). As provided, in most embodiments the fluid heated will be washer, or washing fluid.

In another embodiment, a heated anti-icing cycle, including heating the fluid using the heating element 202 prior to application of the fluid, is performed only selectively later in the process 700, such as at operation 726, described below.

These operations 710, 712 can otherwise be like those 610, 612 described above in connection with FIG. 6, and so are not described further here.

Following application of fluid according to the settings, flow proceeds to block 714, whereat the system 100 awaits a next start of the vehicle. This operation 714 can be like that 614 described above in connection with FIG. 6, and so is not described further here.

In response to the next vehicle start, at block 716, the processor, or as provided above, the user, initiates activation of any wiper system that may be present, such as windshield wipers 112 or headlamp wipers (not shown) to clear any material or residue that may be on the respective surface—e.g., windshield or headlamp cover.

At diamond 718, the processor, or as provided above, the user, determines whether there is any leftover frozen material, such as frost or ice, on the surface(s). This operation can include obtaining readings from one or more sensors, such as the frost sensor, an optical clarity sensor, or any of the sensors described herein. For the driver, they can see whether the windows and mirrors are clear enough for them. Regarding the lights (e.g., head lamps), and whether they are clear, the driver can look before entering the vehicle or rely on vehicle sensor readouts. In any event, a precautionary or extra cleaning can be performed, whether in reply to any determination of remaining unwanted frozen material.

If at decision 718, it is determined that there is no frozen residue, then flow proceeds to block 720, whereat the present anti-icing cycle is determined successful and complete. As provided, the method may be repeated as needed.

As with the algorithm of FIG. 6, the present algorithm 700, in one embodiment, any of the operations can be performed in connection with one or more of multiple subject surfaces without being performed in connection with others of the surfaces. Select performance can depend on the circumstances. For instance, if at decision 718 it is determined that some ice residue is on the front lamp covers 110, but not on the windshield, then the flow can continued to present completion block 720 only in connection with the windshield, and continue to decision 722 in connection with the lamp covers, or just with respect to one if appropriate. Similar selective action is possible in connection with the re-performance of anti-icing fluid application determined needed in connection with the fluid application operation 712 according to the afore-described settings.

If at decision 718, it is determined that there is frozen residue is present on the surface(s), then flow proceeds to decision diamond 722, whereat the processor, or driver, determines whether an ambient temperature is greater than a pre-set temperature. This operation 722 can be like that 622 described above in connection with FIG. 6, and so is not described further here.

As provided, the operations or steps presented can be performed in any order and one or more steps can be removed. As a present example, in one embodiment, decision 722 is not present. In that case, steps 726 and/or 724 would be present as an option(s) to follow.

In response to determining at decision 722 that the ambient temperature is greater than the pre-set temperature, then flow of the algorithm proceeds to block 724, whereat the processor initiates either a washing cycle, as described above in connection with analogous block 624, or another anti-freezing fluid application, like that of operation 712. In one embodiment, this application of anti-freezing fluid at operation 724 is performed without heating the fluid, as dispensing heating fluid is provided following the other branch from decision 722.

Responsive to determining at decision 722 that the ambient temperature is not greater than the pre-set temperature, then flow of the algorithm proceeds to block 726, whereat the processor initiates a heated anti-icing cycle, whereby the heating element 202, and valve 206 if present, are controlled to heat fluid passing from the pump toward the fluid-dispensing nozzles. In one embodiment, this cycle of block 726 is only performed if the processor determines again that the vehicle is parked. And, again, the process 700 or any steps thereof can be repeated.

IX. SUMMARY OF BENEFITS

Many of the benefits of the present technology are described above in the present disclosure. Benefits include keeping ice, frost, and snow off of vehicle windows and mirrors so that a user of the vehicle does not have to scrape them off manually or wait long for a defrost system of the vehicle. Ancillary benefits include saving the user the time of scraping or waiting for the defrost subsystem to have an affect. Ancillary benefits also include saving gasoline and/or battery power otherwise consumed in running the vehicle while scraping and/or running the defrost subsystem.

Another benefit is a general reduction in amount of conventional washer fluid used to clear windows. And still another includes improved battery capacity for hybrid or full electric drive vehicles.\

X. CONCLUSION

Various embodiments of the present disclosure are disclosed herein. The disclosed embodiments are merely examples that may be embodied in various and alternative forms, and combinations thereof.

The law does not require and it is economically prohibitive to illustrate and teach every possible embodiment of the present technology. Hence, the above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims,

What is claimed:

1. A system, for inhibiting ice formation on at least one subject surface of a vehicle, and de-icing if determined needed to remove any frozen matter formed on the surface, comprising:
    an anti-icing fluid reservoir for holding anti-icing fluid;
    a washer fluid reservoir for holding washer fluid;
    a fluid-selecting control valve connected by fluid lines to the anti-icing fluid reservoir and the washer fluid reservoir;
    a processor; and
    a computer-readable medium comprising computer-executable instructions that, when executed by the processor, cause the processor to perform operations comprising:
        determining whether the vehicle is parked;
        initiating, responsive to determining that the vehicle is parked, activation of, or obtaining of readouts from, any local sensors or routines of the system to be used to determine whether any condition triggering initiation of an anti-freezing cycle is present;
        determining whether any of one or more predetermined trigger conditions is present; and
        commencing, if it is determined that a triggering condition is present, an anti-icing cycle, the anti-icing cycle comprising:
            initiating changing of the fluid-selection valve to select the anti-freezing reservoir if it needs changing to such position, or ensuring the valve is in such position; and
            initiating starting of a pump, to, in operation of the system, cause the anti-icing fluid to be pumped from the anti-icing fluid reservoir, through the pump, to and through a fluid-dispensing nozzle, and onto the surface for inhibiting bonding of frozen material on the surface and/or remove any already formed frozen material on the surface.

2. The system of claim 1, above, wherein the sensor includes a frost sensor.

3. The system of claim 1, above, wherein the routine includes at least one of:
    receiving a weather report;
    requesting the weather report;
    obtaining vehicle location data.

4. The system of claim 1, above, wherein the trigger condition includes at least one of:
    receiving a signal from a temperature, rain, and/or frost sensor indicating that a freezing condition is present or imminent;
    receiving a weather report associated with a location of the vehicle indicating that a freezing condition is present or imminent;
    obtaining weather information and location data indicating a location of the vehicle; and
    receiving, from a customer service center, a trigger message to begin an anti-icing cycle.

5. The system of claim 1, above, wherein the at least one subject surface includes at least one of:
    a windshield of the vehicle;
    a side window of the vehicle;
    a rear window of the vehicle;
    an exterior mirror of the vehicle; and
    a light cover of the vehicle.

6. The system of claim 1, above, wherein the fluid is dispensed, through the fluid dispensing nozzle, according to at least one of:
    a pre-determined rate;
    a pre-determined amount of time; and
    in more than one distinct interval.

7. The system of claim 6, above, wherein whether to perform a post-initial interval, of the more than one interval, is determined according to a predetermined setting.

8. The system of claim 6, above, wherein a number of intervals of the more than one distinct interval is controlled by a predetermined setting.

9. The system of claim 1, above, wherein:
    the nozzle is direction-adjustable; and
    the operations further include controlling a position of the nozzle before and/or during dispensing of the anti-icing fluid onto the surface.

10. The system of claim 1, above, wherein the operations further comprise initiating, automatically, in response to a starting of the vehicle, activation of the wiper system.

11. The system of claim 1, above, wherein the operations further comprise determining, subsequent to a starting of the vehicle, whether there is any frozen material on the surface.

12. The system of claim 11, above, wherein the operations further comprise determining, if it is determined that there is frozen material on the surface, weather an ambient temperature is greater than a pre-set temperature.

13. The system of claim 12, above, wherein the operations further comprise initiating, if it is determined that the ambient temperature is greater than the pre-set temperature, a washing cycle.

14. The system of claim 13, above, wherein initiating the washing cycle comprises:
    initiating setting of the valve so that the washing fluid reservoir is selected; and
    initiating operation of the pump, thereby causing washing fluid to flow through the nozzle and onto the surface.

15. The system of claim 12, above, wherein the operations further comprise initiating, if it is determined that the ambient temperature is not greater than the pre-set temperature, a subsequent anti-icing cycle.

16. The system of claim 15, above, wherein:

the system includes a heating element in line between the pump and the nozzle; and the subsequent anti-icing cycle is a micro-heated anti-icing cycle and initiating the heated anti-icing cycle includes adjusting the system so that the heating element heats fluid passing through it from the pump before the fluid is provided to the nozzle and onto the surface.

17. The system of claim 16, above, wherein:

the system includes a heating-element selection valve; and adjusting the system includes setting the valve so that fluid passes through the heating element on its way to the nozzle and onto the surface.

18. A computer-readable storage device comprising computer-executable instructions that, when executed by a processor, cause the processor to perform operations, for inhibiting ice formation on at least one subject surface of a vehicle, and de-icing if determined needed to remove any frozen matter formed on the surface, comprising:

determining whether the vehicle is parked;

initiating, responsive to determining that the vehicle is parked, activation of, or obtaining of readouts from, any local sensors or routines of the system to be used to determine whether any condition triggering initiation of an anti-freezing cycle is present;

determining whether any of one or more predetermined trigger conditions is present; and commencing, if it is determined that a triggering condition is present, an anti-icing cycle, the anti-icing cycle comprising:

initiating changing of a fluid-selection valve, configured and arranged to control whether fluid flows from an anti-freezing reservoir, for holding anti-icing fluid, or a washer fluid reservoir to a fluid-dispensing nozzle, to select the anti-freezing reservoir if it needs changing to such position, or ensuring the valve is in such position; and initiating starting of a pump, to, in operation of the device, cause the anti-icing fluid to be pumped from the anti-icing fluid reservoir, through the pump, to and through the fluid-dispensing nozzle, and onto the surface for inhibiting bonding of frozen material on the surface and/or remove any already formed frozen material on the surface.

19. The computer-readable storage device of claim 18, wherein the operations further comprise:

determining, if it is determined that there is frozen material on the surface, weather an ambient temperature is greater than a pre-set temperature;

initiating, if it is determined that the ambient temperature is greater than the pre-set temperature, a washing cycle; and initiating, if it is determined that the ambient temperature is not greater than the pre-set temperature, a subsequent anti-icing cycle.

20. A method, for inhibiting ice formation on at least one subject surface of a vehicle, and de-icing if determined needed to remove any frozen matter formed on the surface, comprising:

determining, by a system using a processor, whether the vehicle is parked;

initiating, by the system, responsive to determining that the vehicle is parked, activation of, or obtaining of readouts from, any local sensors or routines of the system to be used to determine whether any condition triggering initiation of an anti-freezing cycle is present;

determining, by the system, whether any of one or more predetermined trigger conditions is present; and commencing, by the system, if it is determined that a triggering condition is present, an anti-icing cycle, the anti-icing cycle comprising:

initiating changing of a fluid-selection valve, configured and arranged to control whether fluid flows from an anti-freezing reservoir, for holding anti-icing fluid, or a washer fluid reservoir to a fluid-dispensing nozzle, to select the anti-freezing reservoir if it needs changing to such position, or ensuring the valve is in such position; and initiating starting of a pump to cause the anti-icing fluid to be pumped from the anti-icing fluid reservoir, through the pump, to and through the fluid-dispensing nozzle, and onto the surface for inhibiting bonding of frozen material on the surface and/or remove any already formed frozen material on the surface.

\* \* \* \* \*